US 8,190,352 B2

(12) United States Patent
Brandt et al.

(10) Patent No.: US 8,190,352 B2
(45) Date of Patent: May 29, 2012

(54) METHOD AND DEVICE FOR DIAGNOSING AN EXHAUST GAS CATALYTIC CONVERTER

(75) Inventors: Martin Brandt, Wörth a.d. Donau (DE); Gerd Rösel, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 493 days.

(21) Appl. No.: 12/538,306

(22) Filed: Aug. 10, 2009

(65) Prior Publication Data

US 2010/0037592 A1    Feb. 18, 2010

(30) Foreign Application Priority Data

Aug. 12, 2008  (DE) .......................... 10 2008 038 677

(51) Int. Cl.
*G06F 19/00* (2011.01)
*F01N 11/00* (2006.01)
(52) U.S. Cl. ........................................ 701/114; 60/277
(58) Field of Classification Search .......... 701/102–105, 701/109, 114; 123/672, 673, 690, 694, 696; 702/182, 183, 185, 187; 60/274–278, 285; 73/23.31, 114.75; 703/8
See application file for complete search history.

(56) References Cited

U.S. PATENT DOCUMENTS

| | | | |
|---|---|---|---|
| 6,502,386 B1 * | 1/2003 | Mazur et al. | 60/277 |
| 7,997,257 B2 * | 8/2011 | Korbel et al. | 123/672 |
| 8,005,603 B2 * | 8/2011 | Fisher et al. | 701/103 |
| 2006/0260295 A1 * | 11/2006 | Gielen | 60/285 |
| 2007/0277504 A1 * | 12/2007 | Ishikawa et al. | 60/277 |
| 2008/0028828 A1 * | 2/2008 | Iihoshi et al. | 73/23.2 |
| 2008/0195297 A1 * | 8/2008 | Wang et al. | 701/113 |
| 2008/0257325 A1 * | 10/2008 | Takubo | 123/672 |
| 2009/0248280 A1 * | 10/2009 | Korbel et al. | 701/109 |

FOREIGN PATENT DOCUMENTS

| | | |
|---|---|---|
| DE | 10135759 A1 | 3/2002 |
| DE | 10160704 A1 | 6/2003 |
| DE | 102004008172 A1 | 10/2005 |
| DE | 102005035707 A1 | 2/2007 |
| EP | 0881367 A1 | 12/1998 |

OTHER PUBLICATIONS

German Office Action, German application No. 10 2008 038 677.4-26, 3 pages. Mar. 4, 2009.

* cited by examiner

*Primary Examiner* — Willis Wolfe, Jr.
*Assistant Examiner* — Johnny Hoang
(74) *Attorney, Agent, or Firm* — King & Spalding L.L.P.

(57) ABSTRACT

A first exhaust gas sensor signal (vls_up) of a first exhaust gas sensor (AS1) is detected. In addition, a second exhaust gas sensor signal (vls_down) of a second exhaust gas sensor (AS2) is detected. A relevant first estimated value of an emission of at least one exhaust gas component is determined in relation to a position of the first exhaust gas sensor (AS1) in the exhaust gas tract as a function of the first exhaust gas sensor signal (vls_up) and a relevant second estimated value of an emission of the at least one exhaust gas component is determined in relation to a position of the second exhaust gas sensor (AS2) in the exhaust gas tract as a function of the second exhaust gas sensor signal (vls_down). A conversion rate (K) of the at least one exhaust gas component is estimated as a function of a ratio of the second estimated value and the first estimated value of the determined emission. The exhaust gas catalytic converter is diagnosed as a function of the determined conversion rate (K).

20 Claims, 6 Drawing Sheets

METHOD AND DEVICE FOR DIAGNOSING AN EXHAUST GAS CATALYTIC CONVERTER

CROSS-REFERENCE TO RELATED APPLICATIONS

This application claims priority to DE Patent Application No. 10 2008 038 677.4 filed Aug. 12, 2008, the contents of which is incorporated herein by reference in its entirety.

TECHNICAL FIELD

The invention relates to a method and a device for diagnosing an exhaust gas catalytic converter, in particular an exhaust gas catalytic converter of an internal combustion engine of a motor vehicle.

BACKGROUND

The increasingly strict statutory regulations on permissible pollutant emissions of motor vehicles in which internal combustion engines are mounted require that the pollutant emissions be kept as low as possible in the operation of the internal combustion engine. This can be done on the one hand by reducing the pollutant emissions, which form during the combustion of the air/fuel mixture in the cylinder of the internal combustion engine in question. On the other hand, exhaust gas aftertreatment systems are being used in internal combustion engines that convert the pollutants formed during the combustion process of the air/fuel mixture in the respective cylinders into harmless substances. In particular, in the case of gasoline internal combustion engines, three-way catalytic converters are used as exhaust gas catalytic converters. In this context, it must be ensured that the components of the exhaust gas aftertreatment system also function in the desired nature and manner over a long period of operation and errors are detected in a reliable manner.

SUMMARY

According to various embodiments, a method and a device for diagnosing an exhaust gas catalytic converter can be created, which makes possible a reliable diagnosis.

According to an embodiment, in a method for diagnosing an exhaust gas catalytic converter, —a first exhaust gas sensor signal of a first exhaust gas sensor is detected, which is arranged in an exhaust gas tract upstream of the exhaust gas catalytic converter, —a second exhaust gas sensor signal of a second exhaust gas sensor is detected, which is arranged in the exhaust gas tract downstream of the exhaust gas catalytic converter, —a relevant first estimated value of an emission of at least one exhaust gas component is determined in relation to a position of the first exhaust gas sensor in the exhaust gas tract as a function of the first exhaust gas sensor signal, —a relevant second estimated value of an emission of the at least one gas component is determined in relation to a position of the second exhaust gas sensor in the exhaust gas tract as a relation to the second exhaust gas sensor signal, —a conversion rate of the at least one exhaust gas component is estimated as a function of a relation between the second estimated value and the first estimated value of the determined emission and —the exhaust gas catalytic converter is diagnosed as a function of the determined conversion rate.

According to a further embodiment, the first estimated value and the second estimated value may in each case be integrated over a predetermined period in time or over a predetermined length of route covered by a motor vehicle and the conversion rate of the at least one exhaust gas component can be estimated as a function of a relation between the integrated second and the integrated first estimated value of the emission. According to a further embodiment, at least one value, which is representative of a driving profile with which the motor vehicle is currently being driven can be each time integrated over the predetermined period of time or over the predetermined distance covered by a motor vehicle, a correspondence of the driving profile with at least one part of a predetermined test cycle can be determined as a function of the at least one integrated value, the estimated conversion rate can be compared with a predetermined conversion rate for the—at least one—part of the predetermined test cycle in each case once the correspondence has been determined, and a first error can be detected as a function of the estimated conversion rate and the predetermined conversion rate. According to a further embodiment, a temperature of the exhaust gas catalytic converter can be detected or determined and the relevant estimated conversion rate is allocated, a chronological sequence of the detected or the determined temperatures of the exhaust gas catalytic converter can be checked for the presence of a predetermined temperature curve and if the predetermined temperature curve is present, a chronological sequence that belongs to a chronological sequence of the detected or the determined temperatures of the exhaust gas catalytic converter of the estimated conversion rates can in each case be checked for the presence of a conversion rate curve that is characteristic of a second error. According to a further embodiment, as a function of the chronological sequence of the conversion rates estimated in each case, a local damage to the exhaust gas catalytic converter in a front part and/or a local damage to the exhaust gas catalytic converter in a rear part of the exhaust gas catalytic converter can be detected as the second error. According to a further embodiment, the predetermined temperature curve may represent a monotonously rising or a monotonously falling temperature of the exhaust gas catalytic converter. According to a further embodiment, the predetermined temperature curve may include a rise in the temperature above or a fall in the temperature below a predetermined minimum operating temperature of the exhaust gas catalytic converter. According to a further embodiment, in which the relevant estimated value of the emission of the at least one exhaust gas component may be estimated as a function of an emission model as a function of the first exhaust gas sensor signal or the second exhaust gas sensor signal, a gradient signal, which is determined as a time derivation of the first or the second exhaust gas sensor signals and an mass air flow signal.

According to another embodiment, a device for diagnosing an exhaust gas catalytic converter, may be designed to detect a first exhaust gas sensor signal of a first exhaust gas sensor, which is arranged in an exhaust gas tract upstream of the exhaust gas catalytic converter, to detect a second exhaust gas sensor signal of a second exhaust gas sensor, which is arranged in the exhaust gas tract downstream of the exhaust gas catalytic converter, to determine a relevant first estimated value of an emission of at least one exhaust gas component in relation to a position of the first exhaust gas sensor in the exhaust gas tract as a function of the first exhaust gas sensor signal, to determine a relevant second estimated value of an emission of the at least one exhaust gas component in relation to a position of the second exhaust gas sensor in the exhaust gas tract as a function of the second exhaust gas sensor signal, to estimate a conversion rate of the—at least one—exhaust gas component as a function of a ratio of the second estimated value and the first estimated value of the emission determined and to diagnose the exhaust gas catalytic converter as a function of the determined conversion rate.

BRIEF DESCRIPTION OF THE DRAWINGS

Exemplary embodiments are described in more detail below with reference to the schematic figures of the drawings, in which.

In the figures elements which are constructed or which function is the same way are labeled with the same reference characters.

DETAILED DESCRIPTION

According to various embodiments, in a method and a corresponding device for diagnosing an exhaust gas catalytic converter, a first exhaust gas sensor signal is detected of a first exhaust gas sensor which is arranged in an exhaust gas tract upstream of the exhaust gas catalytic converter. A second exhaust gas sensor signal is detected of a second exhaust gas sensor which is arranged in the exhaust gas tract downstream of the exhaust gas catalytic converter. A first estimated value of an emission in question of at least one exhaust gas component is determined in relation to a position of the first exhaust gas sensor in the exhaust gas tract as a function of the first exhaust gas sensor signal. A second estimated value of an emission in question of the at least one exhaust gas component is determined in relation to a position of the second exhaust gas sensor in the exhaust gas tract as a function of the second exhaust gas sensor signal. A conversion rate of the at least one exhaust gas component is estimated as a function of a ratio of the second and the first estimated values of the recorded emission. The exhaust gas catalytic converter is diagnosed as a function of the recorded conversion rate.

The advantage is that the diagnosis is possible in a simple and in a reliable manner and independent from one another for individual exhaust gas components. As a result, impairments and errors of the functionality of the exhaust gas catalytic converter can be detected in a particularly reliable and in an accurate manner. This means that the robustness and accuracy of the diagnosis can be very high. A reliable on-board diagnosis is possible without additional components in the exhaust gas system being required and without an active intervention in the air-to-fuel ratio of the internal combustion engine being required for the diagnosis. As a result, the diagnosis can take place under neutral emission conditions. The—at least one—exhaust gas component includes in particular carbon monoxide and/or nitrous gases and/or hydrocarbons.

According to an embodiment, the first estimated values and the second estimated values are integrated in each case over a predetermined period in time or over a predetermined distance, covered by a motor vehicle. The conversion rate of the—at least one—exhaust gas component is estimated as a function of a ratio of the integrated second estimated value and the integrated first estimated value of the recorded emission. The advantage is that the diagnosis can take place in a particularly robust and in an accurate manner.

In this context, it can be advantageous for at least one value, which is representative of a driving profile with which the motor vehicle is currently being driven to be integrated over the predetermined period in time or over the predetermined length of distance which is covered by a motor vehicle. A correspondence of the driving profile with the, at least one, part of a predetermined test cycle is recorded as a function of the—at least one—integrated value. The estimated conversion rate is compared each time with the predetermined conversion rate for the—at least one—part of the predetermined test cycle if the correspondence was determined. A first error is detected as a function of the estimated conversion rate and the predetermined conversion rate. The advantage is that as a result, a reliable statement can be made as to whether or not the exhaust gas catalytic converter is functioning sufficiently well for emissions which occur during the operation of the motor vehicle in accordance with the predetermined test cycle to meet predetermined emission limits, and in particular predetermined legal emission limits. As a result, a particularly reliable diagnosing is possible which is highly informative. Preferably the first error is detected when the estimated conversion rate deviates from the predetermined conversion rate by a predetermined amount or factor and the estimated conversion rate therefore exceeds the predetermined conversion rate in particular by the predetermined amount or factor.

According to a further embodiment, a temperature of the exhaust gas catalytic converter is detected or determined and is allocated to the respective estimated conversion rate. A chronological sequence of the detected or the determined temperatures of the exhaust gas catalytic converter is tested for the presence of a predetermined temperature curve. On the occurrence of the predetermined temperature curve, a chronological sequence belonging to the sequence of the detected or the determined temperatures of the exhaust gas catalytic converter of the respective conversion rates estimated is tested for the presence of a conversion rate curve, which is characteristic of a second error. The advantage is that this enables zone damage, namely uneven damage to the exhaust gas catalytic converter, to be detected, which would remain undetected during diagnosis of the exhaust gas catalytic converter based on an oxygen storage ability of the exhaust gas catalytic converter. Therefore, the diagnosis of the exhaust gas catalytic converter can be particularly reliable.

In this context, it can be advantageous if, as a function of the chronological sequence of the estimated conversion rates in each case, a local damage to the exhaust gas catalytic converter is detected in a front part and/or a local damage to the exhaust gas catalytic converter in a rear part of the exhaust gas catalytic converter as the second error. As a result, an accurate statement can be made about the location of damage and because of its significance for the ability of the exhaust gas catalytic converter to convert exhaust gas components into harmless substances, about the effects of the damage on the emissions. The rear part of the exhaust gas catalytic converter is arranged downstream of the front part of the exhaust gas catalytic converter.

According to a further embodiment, the predetermined temperature curve represents a monotonously rising or a monotonously falling temperature of the exhaust gas catalytic converter. The advantage is that the second error can be detected in such a simple and reliable manner in this way.

According to yet a further embodiment, the predetermined temperature curve includes a rise in the temperature above or a fall in the temperature below a predetermined minimum operating temperature of the exhaust gas catalytic converter.

As a result, the second error can particularly be detected in a simple and in a reliable manner.

According to yet a further embodiment, the estimated value of the relevant emission of the at least one exhaust gas component is estimated as a function of an emission model as a function of the first exhaust gas sensor signal or the second exhaust gas sensor signal, a gradient signal which is determined as a time derivation of the first exhaust gas sensor signal or the second exhaust gas sensor signal, and an mass air flow signal. A reliable estimation of the emission is possible by means of such an emission model.

Figure 1:
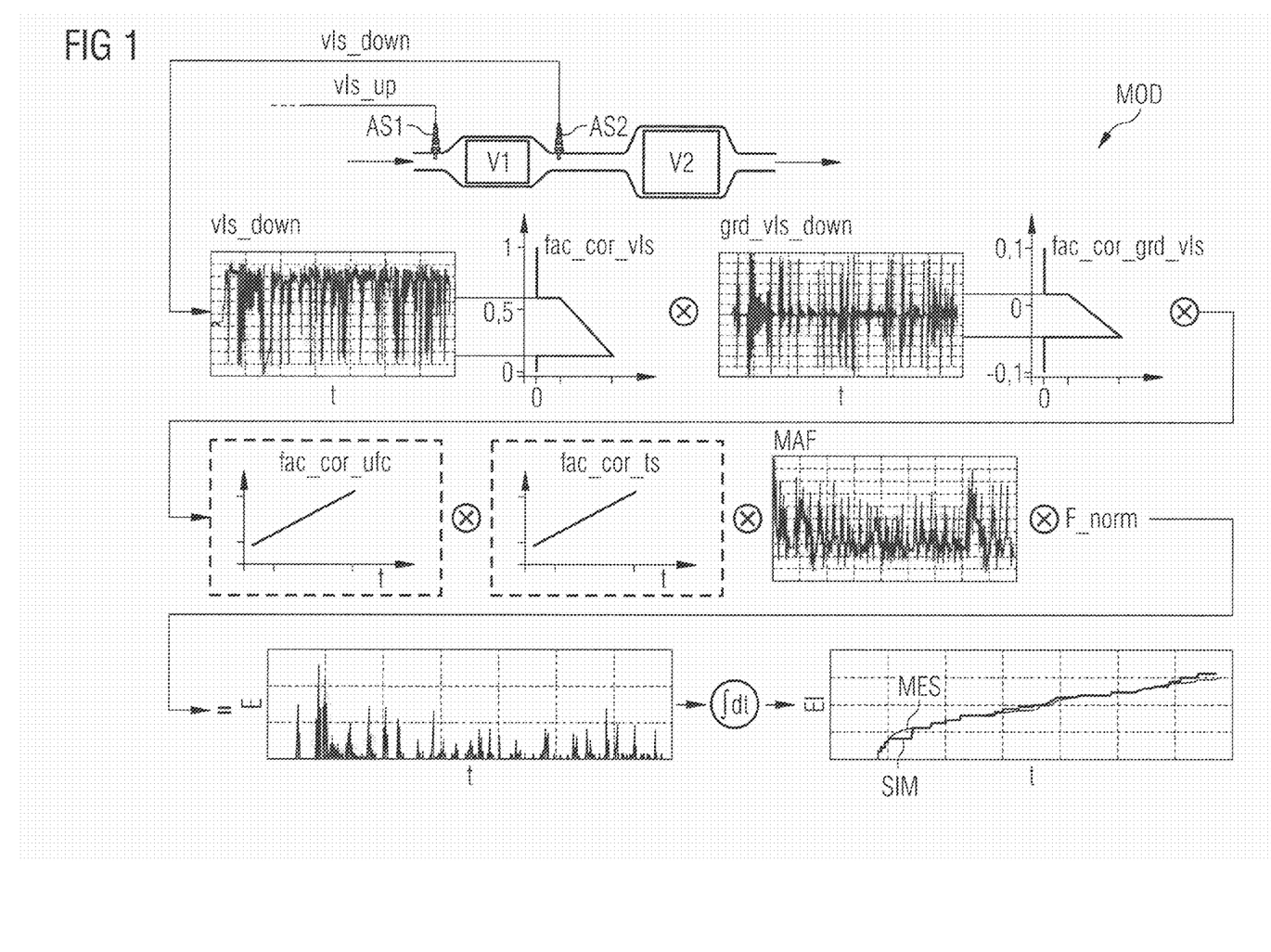
FIG. 1 shows a part of an exhaust gas tract and an emission model.

An exhaust gas aftertreatment system of an internal combustion engine, for example a motor vehicle, includes at least one exhaust gas catalytic converter with at least one first catalytic converter volume V1 (FIG. 1). In addition, provision can be made for a second catalytic converter volume V2 downstream of the first catalytic converter volume. A first exhaust gas sensor AS1 is arranged upstream of the first catalytic converter volume V1, which is for example embodied as a linear lambda probe in order to detect a residual oxygen content in the exhaust gas upstream of the first catalytic converter volume V1 and which is for example used for a lambda control. However, the first exhaust gas sensor AS1 can for example also be embodied as a binary lambda probe. Downstream of the first catalytic converter volume V1 and upstream of the second catalytic converter volume V2, a second exhaust gas sensor AS2 is arranged, which is for example embodied as a binary lambda probe, which may however also be embodied in another manner such as for example a linear lambda probe. The second exhaust gas sensor AS2 can for example be used for a diagnosis of the first catalytic converter volume V1.

The first and, if required, the second catalytic converter volumes V1, V2 can be embodied in the exhaust gas catalytic converter of the exhaust gas aftertreatment system. However the first and the second catalytic converter volumes V1, V2 are preferably embodied in separate exhaust gas catalytic converters. The first catalytic converter volume V1 is preferably arranged close to the internal combustion engine, so that it, after starting of the internal combustion engine, can reach a minimum predetermined operating temperature T_min required for the exhaust gas aftertreatment in a short time. The second catalytic converter volume V2 is for example embodied in an underfloor catalytic converter and is in this way farther away from the internal combustion engine and therefore only reaches, if necessary, the required operating temperature later than the first catalytic converter volume V1.

Provision has been made for an emission model MOD in order to determine an emission E of at least one exhaust gas component. The—at least one—exhaust gas component in particular includes carbon monoxide CO and/or nitrous gases NOx and/or hydrocarbons HC, but can however also include other or further substances. By means of the emission model MOD, the emission E is estimated as a function of the first exhaust gas sensor signal vls_up of the first exhaust gas sensor AS1 in relation to a position of the first exhaust gas sensor AS1 in the exhaust gas tract. Accordingly, by means of the emission model MOD, the emission E is estimated as a function of a second exhaust gas sensor signal vls_down of the second exhaust gas sensor AS2 in relation to a position of the second exhaust gas sensor AS2 in the exhaust gas tract.

The emission E is in each case preferably determined by means of the emission model MOD as a product of the first exhaust gas sensor signal or the second exhaust gas sensor signal vls_up, vls_down, of a relevant predetermined exhaust gas sensor signal correction characteristic curve fac_cor_vls, a relevant gradient signal grd_vls_down, a relevant predetermined gradient signal correction characteristic curve fac_cor_grd_vls, an mass air flow signal MAF and a predetermined standardization factor F_norm. As further factors, provision has preferably been made for a predetermined correction characteristic curve fac_cor_ufc of the—at least one—second catalytic converter volume V2 and/or a characteristic value correction characteristic curve fac_cor_ts. As an alternative, the relevant correction characteristic curves can also be embodied as a relevant correction performance graph. The emission model MOD can also be embodied in another way and can in particular also include further, other or only one subset of the factors mentioned.

The gradient signal grd_vls_down represents a derivation in time of the first exhaust gas sensor signal or the second exhaust gas sensor signal vls_up, vls_down. The exhaust gas sensor signal correction characteristic curve fac_cor_vls predetermined in each case and the gradient signal correction characteristic curve fac_cor_grd_vls predetermined in each case are in particular provided in order to cut out and, if required, scale the predetermined signal components such as for example in each case a predetermined range of values from the first exhaust gas sensor signal or the second exhaust gas sensor signal vls_up, vls_down or the gradient signal grd_vls_down in question. Preferably the predetermined exhaust gas sensor signal correction characteristic curve fac_cor_vls in question and the respective gradient signal correction characteristic curve fac_cor_grd_vls are predetermined as a function of the relevant predetermined exhaust gas components in each case, meaning that for each exhaust gas component for which the emission E is to be estimated, the associated predetermined exhaust gas sensor signal correction characteristic curve fac_cor_vls and the predetermined gradient signal correction characteristic curve fac_cor_grd_vls are used in each case.

The mass air flow signal MAF is representative of an exhaust gas flow through the exhaust gas tract and thereby through the first and the second catalytic converter volumes V1, V2. The predetermined standardization factor F_norm is provided for example to prepare the estimated values of the emission E in a form and in particular in a scaling which is suitable for a further processing and in particular for example for a comparison with emission limit values and especially legally-prescribed emission limit values. Preferably the estimated emission E is integrated for the exhaust gas component in question and made available as an integrated emission EI. The emission E and the integrated emission EI essentially involve different methods of representation, so that statements made in relation to the emission E, basically also apply analogously to the integrated emission EI and vice versa. As a result, in the following both the emission E and the integrated emission EI are not always specified explicitly when statements refer to both.

The emission model MOD makes possible the estimation of the emissions E or the integrated emissions EI in such a way that an estimated or a simulated emission curve SIM essentially corresponds to an actual or a measured emission curve MES.

A diagnosis of a catalytic converter efficiency factor, which can also be referred to as a conversion rate K, may take place on the basis of an oxygen storage capacity OSC or an oxygen storage capacity of the exhaust gas catalytic converter. However, different aging mechanisms of the catalytic converter may however have different effects on the converting behavior of the catalytic converter with regard to the relevant exhaust gas components. Thus for example, a system can by means of aging processes change from an HC-sensitive to an NOx-sensitive system and vice versa. However, in this respect the oxygen storage capacity OSC does not make possible a reliable statement. As a result, the conversion rate K is estimated as a function of the emissions E estimated by using the emission model MOD upstream and downstream of the exhaust gas catalytic converter.

Figure 2:
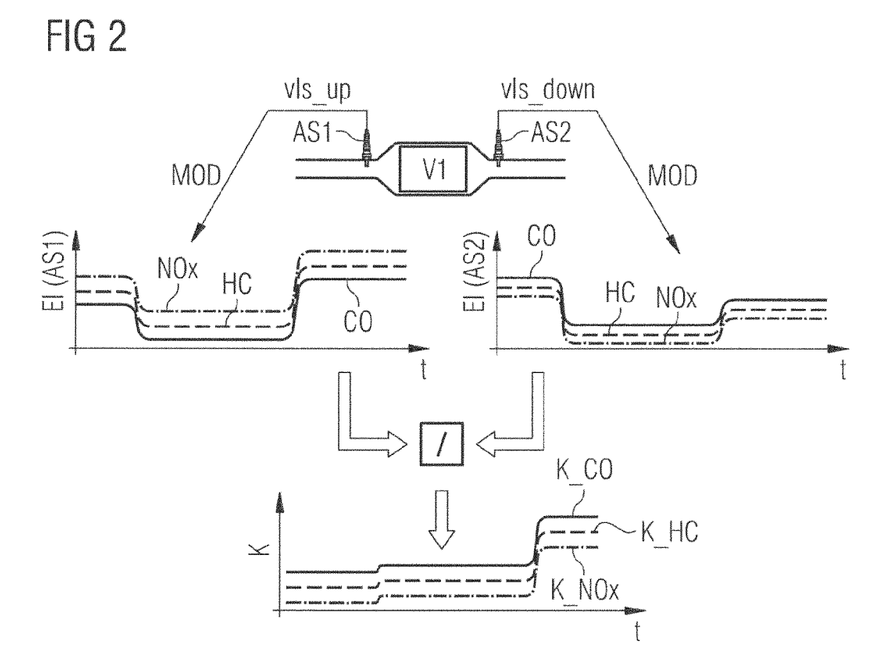
FIG. 2 shows a flow diagram for an estimated conversion rate of an exhaust gas catalytic converter.

FIG. 2 shows a diagram for the estimation of the relevant conversion rate K of the exhaust gas components in question. By means of the emission model MOD, the emission E or the integrated emission EI is determined as a function of the first exhaust gas sensor signal vls_up or the second exhaust gas sensor signal vls_down in each case. As a function of a ratio of these emissions E or the integrated emissions EI, the relevant conversion rate K is determined in particular as a carbon monoxide conversion rate K_CO and/or a hydrocarbon conversion rate K_HC and/or a nitric oxide conversion rate K_NOx. FIG. 2 for example shows curves of the relevant integrated emission EI and the conversion rates K over a time t.

Figure 3:
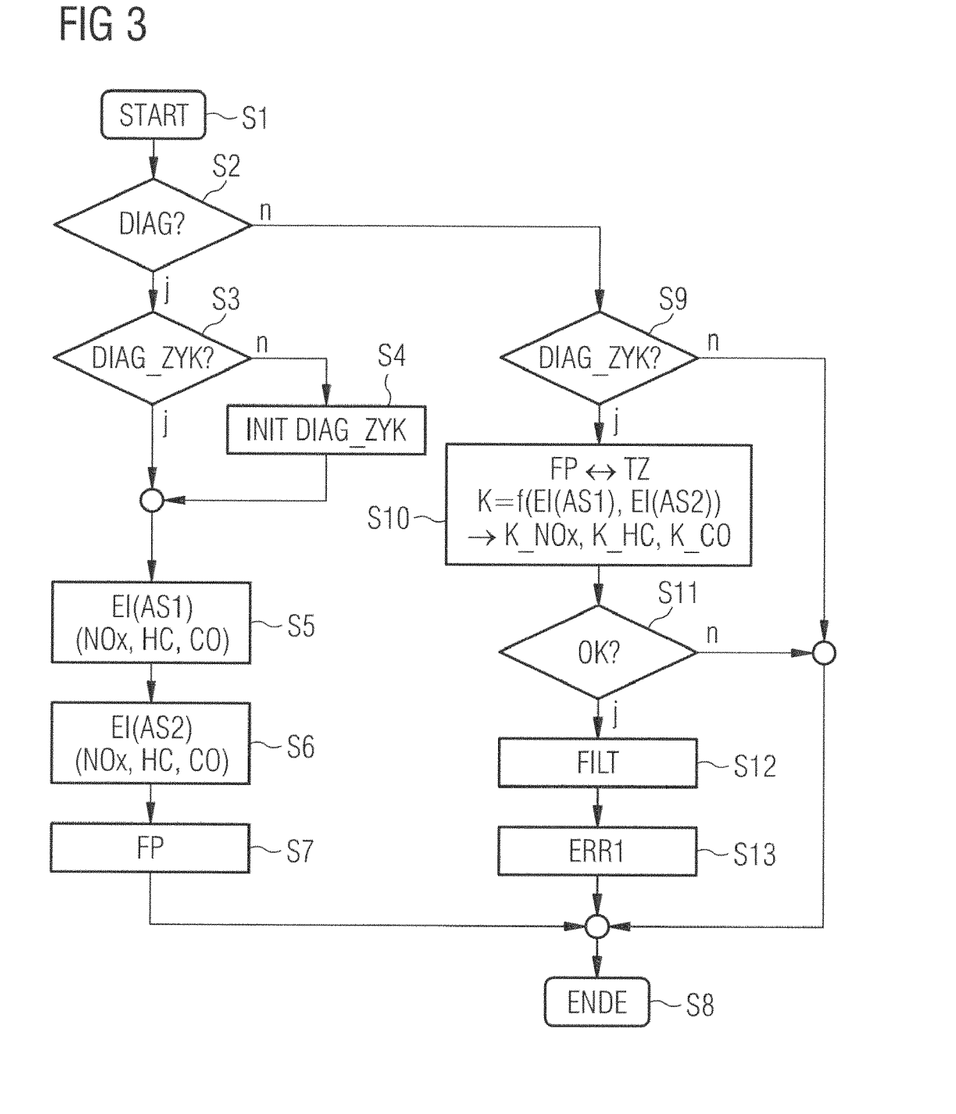
FIG. 3 shows a first flow diagram for a diagnosis of the exhaust gas catalytic converter.

FIG. 3 shows a first flow diagram of a program in order to diagnose the exhaust gas catalytic converter, in particular in relation to its conversion rate K of the relevant exhaust gas component. The program starts in a step S1. In a step S2, a check is carried out in order to determine whether or not a predetermined diagnosis condition DIAG has been met. This includes for example a proper functioning of the first and the second exhaust gas sensors AS1, AS2. In addition, the predetermined diagnosis condition DIAG can also include that the exhaust gas catalytic converter has reached its predetermined minimum operating temperature T_min and/or that a current driving profile FP is suitable for a diagnosis or should be evaluated. Provision may for example be made for abandoning an evaluation in the case of driving profiles FP, which include a drive on the highway at a high speed because provision has not been made for such driving profiles in a predetermined test cycle TZ.

Should the predetermined diagnosis condition DIAG be met, then a check is carried out in a step S3 in order to determine whether or not a diagnosis cycle DIAG_ZYK is active. Should this not be the case, then the diagnosis cycle DIAG_ZYK is initialized in a step S4. In a step S5, the integrated emission EI by integration of the emission E that corresponds to a crude emission is determined for the first exhaust gas sensor AS1 during the diagnosis cycle DIAG_ZYK. In a step S6, the integrated emission EI by integration of emission E that corresponds to an aftercatalytic converter emission is determined for the second exhaust gas sensor AS2 during the diagnosis cycle DIAG_ZYK. The integration preferably takes place over a predetermined period in time such as for example approximately ten seconds, or over a predetermined length of route such as for example one hundred meters. In a step S7, at least one value which is representative of the driving profile FP in which the motor vehicle is currently being driven is analyzed and integrated during the diagnosis cycle DIAG_ZYK, this means during the predetermined period in time or the predetermined length of route. The—at least one—value can for example include an acceleration of the motor vehicle and/or a rotational speed of the internal combustion engine. The program is ended in a step S8 and is preferably run again in cycles such as for example at a predetermined time interval.

Should the diagnosis condition DIAG not be met in a step S2, then a check is carried out in a step S9 in order to determine whether or not the current diagnosis cycle DIAG_ZYK is complete or has been concluded. Should this condition not be met, then the program is ended in a step S8 and preferably run again. However, should the condition be met in a step S9, then the driving profile FP in a step S10, which was determined and analyzed during the diagnosis cycle DIAG_ZYK, is checked for a correlation with at least one part of the predetermined test cycle TZ. The predetermined test cycle TZ is for example predetermined by regulations and in particular statutory regulations in order to check the emissions of motor vehicles. In addition, in a step S10, the conversion rate K of the at least one exhaust gas component is determined. In this respect, the steps S5, S6 and S10 correspond to the procedure shown in FIG. 2 and in FIG. 1. In a step S11, a check is carried out in order to determine whether not the determined conversion rate K adhered to a predetermined limit value, which is in particular predetermined for the—at least one—part of the predetermined test cycle TZ or whether or not one of the predetermined limit values has been exceeded. Should the predetermined limit value be exceeded, then provision has been made in a step S12 for a filtering and a debouncing FILT of an error detection in a preferred manner. A first error ERR1 is detected in a step S13 and a corresponding error entry is made in an error memory and/or a warning light switched on. By means of the filtering and the debouncing FILT short-term outliers in the emissions E can be prevented from leading to an error entry although the functionality of the exhaust gas catalytic converter is not adversely affected. The program is ended in a step S8. In addition, the program is likewise ended in a step S8 if in a step S11 it was detected that the predetermined limit value was adhered to accordingly. The program is preferably carried out repeatedly in a cyclical manner. By means of the program it is in particular possible to carry out the diagnosis for each of the—at least one—exhaust gas components separately and this thus makes possible a particularly detailed and accurate statement of the diagnosis.

A local spatially limited damage to the catalytic converter can lead to a marked degradation of the conversion of harmful substances of the catalytic converter in the predetermined test cycle TZ, without it being possible to detect this damage in a diagnosis based on an oxygen storage capacity OSC of the conversion rate K. Should a comparison for example be made between two exhaust gas catalytic converters which have the same aging state, that is to say in particular the same oxygen storage capacity OSC and in which a first one of said exhaust gas catalytic converters is mainly damaged in a rear part V1_b—said first exhaust gas catalytic converter is shown on the left hand side in FIG. 2—and a second one of said exhaust gas catalytic converters is mainly damaged in a front part V1_a—shown on the right hand side in FIG. 2 and in this way the exhaust gas aftertreatment system with the second exhaust gas catalytic converter in the predetermined test cycle TZ will show higher HC emissions than the exhaust aftertreatment system with the first exhaust gas catalytic converter. The predetermined minimum operating temperature, which is also referred to as the "light-off" temperature, that is to say that temperature in which the conversion of the exhaust gas components is used in the exhaust gas catalytic converter, is reached later in the second exhaust gas catalytic converter than in the first exhaust gas catalytic converter. In the case of the second exhaust gas catalytic converter, the catalytically damaged front part V1_a is first of all warmed before the catalytically active rear part V1_b is heated.

Figure 4:
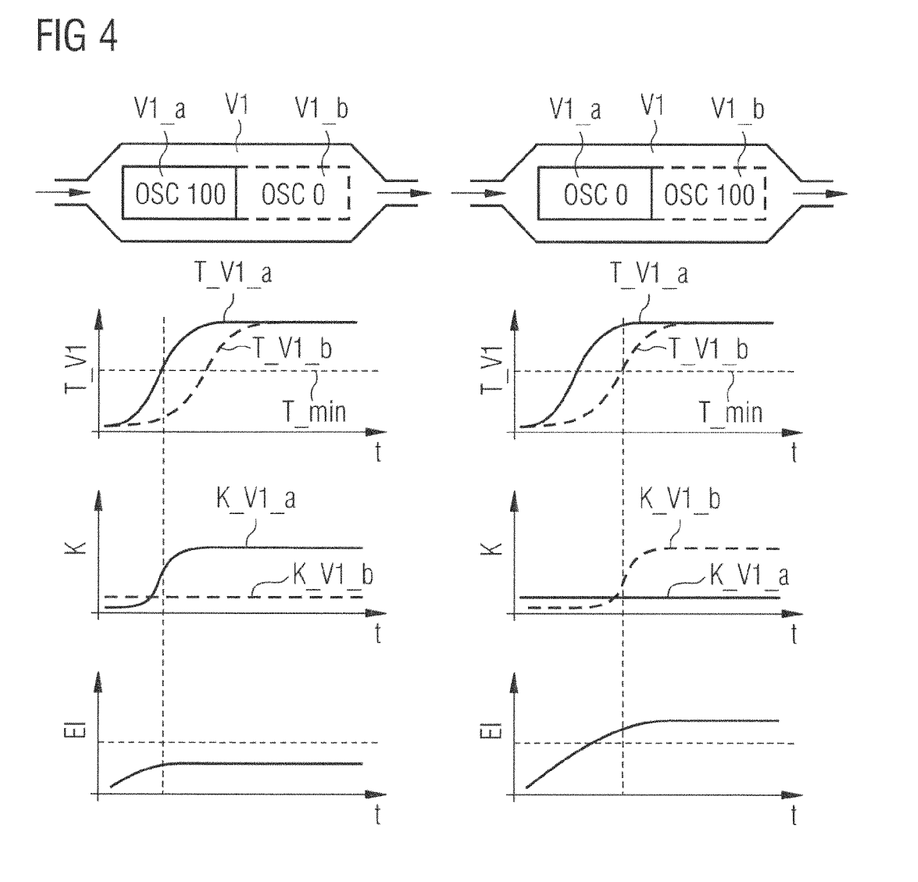
FIG. 4 shows a representation of a comparison between two differently damaged exhaust gas catalytic converters.

At the start of the predetermined test cycle TZ, the system for preparing the mixture in most cases finds itself in a pre-controlled state, that is to say a control of the air-to-fuel ratio still does not take place. This leads to the fact that usually a mixture which is too rich in fuel is adjusted which leads to higher HC crude emissions at the start of the predetermined test cycle TZ. Should these higher HC crude emissions apply to the second exhaust gas catalytic converter, which on the basis of its local damage to the front area only converts at a later stage; the vehicle emission increases overproportionally in the predetermined test cycle TZ so that the predetermined emission limit values are exceeded. However, the diagnosis based on the oxygen storage capacity OSC would however likewise diagnose both the first exhaust gas catalytic converter and the second exhaust gas catalytic converter as being operable. FIG. 4 shows the curves of a temperature T_V1 of the first catalytic converter volume V1 and in particular a temperature T_V1_a of the front part V1_a of the first catalytic converter volume V1 and a temperature T_V1_b of the rear part V1_b of the first catalytic converter volume V1, as well as the curves of the conversion rate K and in particular of a conversion rate K_V1_a of the front part V1_a and a conversion rate K_V1_b of the rear part V1_b of the first catalytic converter volume V1 and a resulting curve of the integrated emission EI over time t for the first exhaust gas catalytic converter and the second exhaust gas catalytic converter.

Figure 5:
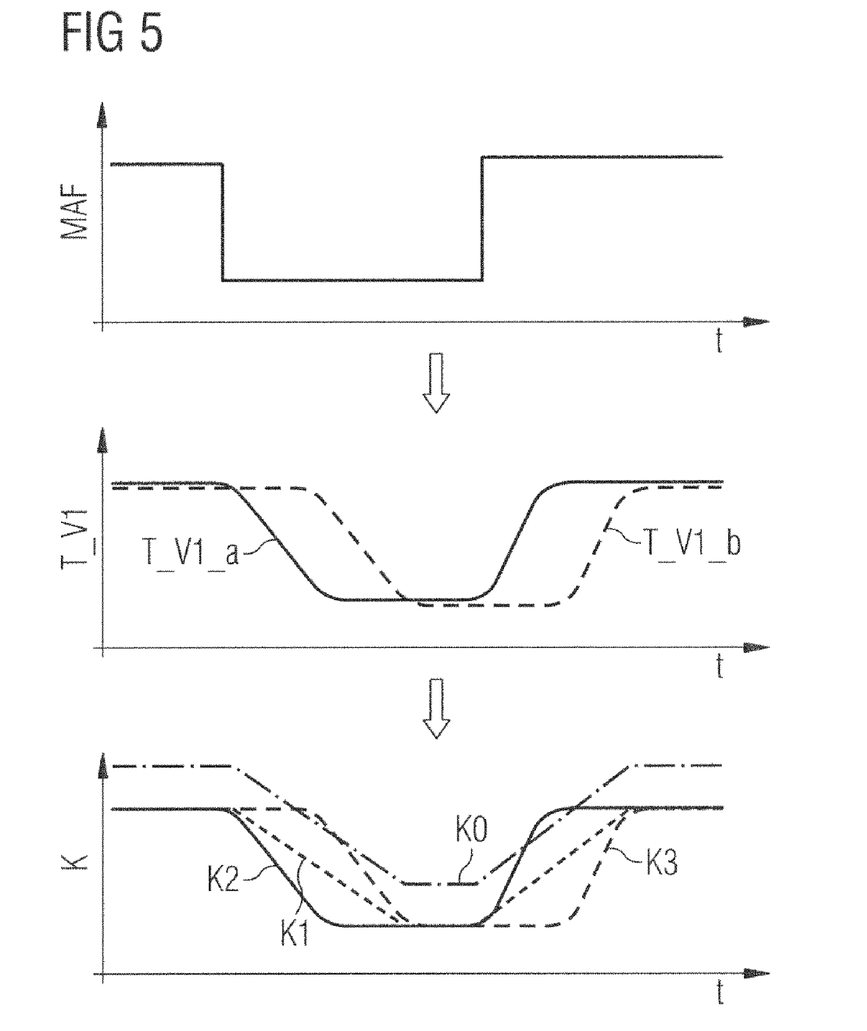
FIG. 5 shows a representation of temperature curves and the conversion rate curves in the case of load fluctuations.

From a curve of the conversion rate K as a function of the temperature T_V1 of the first catalytic converter volume V1, it can be concluded that there is a potentially irregular damage to the exhaust gas catalytic converter. For this purpose, a behavior during a load fluctuation can for example be investigated. Two load leaps are shown in FIG. 5 by a time slope of the mass air flow signal MAF. In addition, the accompanying curves of the temperatures T_V1_a, T_V1_b of the front and the rear part V1_a, V1_b of the first catalytic converter volume V1 and the resulting conversion rate K are shown. The temperature T_V1 of the first catalytic converter volume V1 depends on a temperature and volume of the exhaust gases flowing through it. During a thrust phase or an idling phase, the temperature T_V1 of the first catalytic converter volume V1 drops because correspondingly less warm exhaust gas and in the thrust cold suction air flows through it. In this process, a temperature gradient forms between the front and the rear part V1_a, V1_b so that one may from the curve of the conversion rate K during cooling or heating, conclude that local damage has taken place and should the front part V1_a be damaged then a cooling in the front part would not contribute to the worsening of the conversion rate K. Should the front part V1_a be damaged, a delayed use of the conversion with the heating of the exhaust gas catalytic converter would be observed. Should the rear part V1_b of the first catalytic converter volume V1 be damaged, a premature worsening of the conversion rate K would be observed as soon as the temperature of the exhaust gas catalytic converter drops. On the other hand, during the heating of the exhaust gas catalytic converter, an instantaneous reaction of the conversion rate K can however be seen. From the curve of the conversion rate after the load fluctuation, the damage limited to the local area of the exhaust gas catalytic converter can hence be derived.

A conversion rate K1 of a uniformly damaged exhaust gas catalytic converter proceeds at a lower level than a conversion rate K0 of an as good as new exhaust gas catalytic converter, but in essence, proceeds parallel to it. A curve of a conversion rate K3 of the second exhaust gas catalytic converter damaged in the front part V1_a is delayed in time in relation to a curve of a conversion rate K2 of the first catalytic converter damaged in the rear part V1_b. This can be used for the diagnosis.

Figure 6:
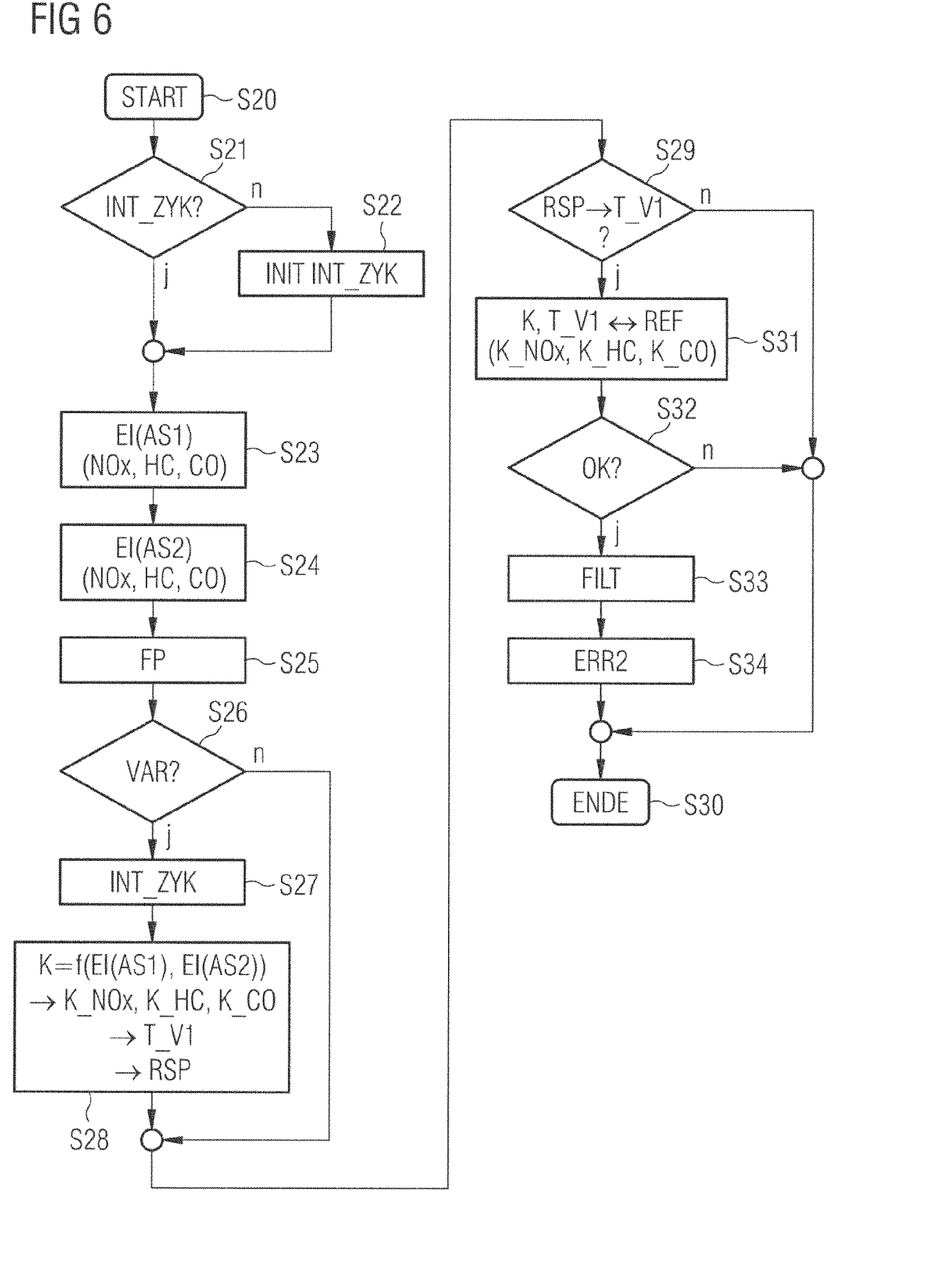
FIG. 6 shows a second flow diagram for a diagnosis of the exhaust gas catalytic converter.

FIG. 6 shows a second flow diagram of the program for diagnosing the exhaust gas catalytic converter. The program starts in a step S20. In a step S21, a check is carried out in order to determine whether not an integration cycle INT_ZYK is active. Should this not be the case then the integration cycle INT_ZYK is initialized in a step S22. The steps S23 to S25 essentially correspond to the steps S5 to S7 of the program shown in FIG. 3. In a step S26 a check is carried out in order to determine whether an accuracy of the detected or the determined data is sufficient. It is for example possible by determining a variability VAR such as for example a standard deviation to determine whether or not there is an outlier. Should the accuracy be sufficient then the integration cycle INT_ZYK is ended in a step S27 and the conversion rate K is determined in a step S28 in accordance with a step S10. In addition, the temperature T_V1 of the first catalytic converter volume V1 is detected or determined for the integration cycle INT_ZYK and allocated to the conversion rate K stored in a ring memory RSP in a preferred manner. By means of carrying out the steps S21 to S28 in a cyclically repeated manner, a temperature curve of the exhaust gas catalytic converter and an accompanying conversion rate curve are stored in the ring memory RSP. Storing in the ring memory RSP does not take place when the accuracy is insufficient in accordance with a step S26.

An activation of a zone damage detection takes place in a step S29 in that the temperature curve stored in the ring memory RSP is compared with at least one predetermined temperature curve for example after a load fluctuation and a sufficient correspondence is hence established. The activation in particular takes place when a cooling of the exhaust gas catalytic converter is detected below the predetermined minimum operating temperature T_min such as for example in the case of a thrust phase of long duration or an idling phase such as for example ahead of a traffic light or when a heating is detected above the predetermined minimum operating temperature T_min. In a step S31, the accompanying conversion rate curve is compared as a function of the temperature T_V1 in accordance with the temperature curve with at least one reference curve REF. This preferably takes place separately for each of the at least one exhaust gas components.

In a step S32, a check is carried out in order to determine whether not the conversion rate curve in relation to the reference curve is adhering to another predetermined limit value or whether or not the further predetermined limit value is exceeded. Should the predetermined limit value be exceeded, then provision has been made in a step S33 according to a step S12 for the filtering and the debouncing FILT of the error detection in a preferred manner. In a step S34, a second error ERR2 is detected according to a step S13 and a corresponding error entry is made in an error memory and/or a warning light is switched on. Filtering and debouncing FILT can be used to prevent short outliers leading to an error entry although there is no locally limited zone damage to the exhaust gas catalytic converter. The program is ended in a step S30. In addition, the program is likewise ended in a step S30 if in a step S32 it was detected that the other predetermined limit value was adhered to accordingly. The program is preferably run repeatedly in cycles. With the program, the diagnosis can in particular be carried out separately for each of the at least one exhaust gas components and in this way makes possible a particularly detailed and accurate diagnosis statement. The steps S21 to S29 are preferably carried out continuously during the operation of the motor vehicle.

What is claimed is:

1. A method for diagnosing an exhaust gas catalytic converter, comprising the steps of:
    detecting a first exhaust gas sensor signal of a first exhaust gas sensor which is arranged in an exhaust gas tract upstream of the exhaust gas catalytic converter,
    detecting a second exhaust gas sensor signal of a second exhaust gas sensor which is arranged in the exhaust gas tract downstream of the exhaust gas catalytic converter,
    determining a relevant first estimated value of an emission of at least one exhaust gas component in relation to a position of the first exhaust gas sensor in the exhaust gas tract as a function of the first exhaust gas sensor signal, determining a relevant second estimated value of an emission of the at least one gas component in relation to a position of the second exhaust gas sensor in the exhaust gas tract as a relation to the second exhaust gas sensor signal, estimating a conversion rate of the at least one exhaust gas component as a function of a relation between the second estimated value and the first estimated value of the determined emission, and diagnosing the exhaust gas catalytic converter as a function of the determined conversion rate.

2. The method according to claim 1, wherein the first estimated value and the second estimated value are in each case integrated over a predetermined period in time or over a predetermined length of route covered by a motor vehicle and the conversion rate of the at least one exhaust gas component is estimated as a function of a relation between the integrated second and the integrated first estimated value of the emission.

3. The method according to claim 2, wherein at least one value, which is representative of a driving profile with which the motor vehicle is currently being driven is each time integrated over the predetermined period of time or over the predetermined distance covered by a motor vehicle, a correspondence of the driving profile with at least one part of a predetermined test cycle is determined as a function of the at least one integrated value, the estimated conversion rate is compared with a predetermined conversion rate for the—at least one—part of the predetermined test cycle in each case once the correspondence has been determined, and a first error is detected as a function of the estimated conversion rate and the predetermined conversion rate.

4. The method according to claim 1, wherein a temperature of the exhaust gas catalytic converter is detected or determined and the relevant estimated conversion rate is allocated, a chronological sequence of the detected or the determined temperatures of the exhaust gas catalytic converter is checked for the presence of a predetermined temperature curve and if the predetermined temperature curve is present, a chronological sequence that belongs to a chronological sequence of the detected or the determined temperatures of the exhaust gas catalytic converter of the estimated conversion rates is in each case checked for the presence of a conversion rate curve that is characteristic of a second error.

5. The method according to claim 4, wherein as a function of the chronological sequence of the conversion rates estimated in each case, at least one of a local damage to the exhaust gas catalytic converter in a front part and a local damage to the exhaust gas catalytic converter in a rear part of the exhaust gas catalytic converter is detected as the second error.

6. The method according to claim 4, wherein the predetermined temperature curve represents a monotonously rising or a monotonously falling temperature of the exhaust gas catalytic converter.

7. The method according to claim 4, wherein the predetermined temperature curve includes a rise in the temperature above or a fall in the temperature below a predetermined minimum operating temperature of the exhaust gas catalytic converter.

8. The method according to claim 1, wherein the relevant estimated value of the emission of the at least one exhaust gas component is estimated as a function of an emission model as a function of the first exhaust gas sensor signal or the second exhaust gas sensor signal, a gradient signal, which is determined as a time derivation of the first or the second exhaust gas sensor signals and an mass air flow signal.

9. A device for diagnosing an exhaust gas catalytic converter, the device being operable to detect a first exhaust gas sensor signal of a first exhaust gas sensor, which is arranged in an exhaust gas tract upstream of the exhaust gas catalytic converter, detect a second exhaust gas sensor signal of a second exhaust gas sensor, which is arranged in the exhaust gas tract downstream of the exhaust gas catalytic converter, determine a relevant first estimated value of an emission of at least one exhaust gas component in relation to a position of the first exhaust gas sensor in the exhaust gas tract as a function of the first exhaust gas sensor signal, determine a relevant second estimated value of an emission of the at least one exhaust gas component in relation to a position of the second exhaust gas sensor in the exhaust gas tract as a function of the second exhaust gas sensor signal, estimate a conversion rate of the—at least one—exhaust gas component as a function of a ratio of the second estimated value and the first estimated value of the emission determined and to diagnose the exhaust gas catalytic converter as a function of the determined conversion rate.

10. The device according to claim 9, wherein the device is further operable to integrate the first estimated value and the second estimated value are in each case over a predetermined period in time or over a predetermined length of route covered by a motor vehicle, and to estimate the conversion rate of the at least one exhaust gas component as a function of a relation between the integrated second and the integrated first estimated value of the emission.

11. The device according to claim 10, wherein at least one value, which is representative of a driving profile with which the motor vehicle is currently being driven is each time integrated over the predetermined period of time or over the predetermined distance covered by a motor vehicle, a correspondence of the driving profile with at least one part of a predetermined test cycle is determined as a function of the at least one integrated value, the estimated conversion rate is compared with a predetermined conversion rate for the—at least one—part of the predetermined test cycle in each case once the correspondence has been determined, and a first error is detected as a function of the estimated conversion rate and the predetermined conversion rate.

12. The device according to claim 9, wherein the device is further operable to detect or determine a temperature of the exhaust gas catalytic converter and to allocate the relevant estimated conversion rate, check a chronological sequence of the detected or the determined temperatures of the exhaust gas catalytic converter for the presence of a predetermined temperature curve and if the predetermined temperature curve is present, to check a chronological sequence that belongs to a chronological sequence of the detected or the determined temperatures of the exhaust gas catalytic converter of the estimated conversion rates in each case for the presence of a conversion rate curve that is characteristic of a second error.

13. The device according to claim 12, wherein as a function of the chronological sequence of the conversion rates estimated in each case, at least one of a local damage to the exhaust gas catalytic converter in a front part and a local damage to the exhaust gas catalytic converter in a rear part of the exhaust gas catalytic converter is detected as the second error.

14. The device according to claim 12, wherein the predetermined temperature curve represents a monotonously rising or a monotonously falling temperature of the exhaust gas catalytic converter.

15. The device according to claim 12, wherein the predetermined temperature curve includes a rise in the temperature above or a fall in the temperature below a predetermined minimum operating temperature of the exhaust gas catalytic converter.

16. The device according to claim 9, wherein the device is further operable to estimate the relevant estimated value of the emission of the at least one exhaust gas component as a function of an emission model as a function of the first exhaust gas sensor signal or the second exhaust gas sensor signal, a gradient signal, which is determined as a time derivation of the first or the second exhaust gas sensor signals and an mass air flow signal.

17. A system for diagnosing an exhaust gas catalytic converter, comprising:
a first exhaust gas sensor which is arranged in an exhaust gas tract upstream of the exhaust gas catalytic converter and provides a first exhaust gas sensor signal,
a second exhaust gas sensor which is arranged in the exhaust gas tract downstream of the exhaust gas catalytic converter and provides a second exhaust gas sensor signal,
means for determining a relevant first estimated value of an emission of at least one exhaust gas component in relation to a position of the first exhaust gas sensor in the exhaust gas tract as a function of the first exhaust gas sensor signal,
means for determining a relevant second estimated value of an emission of the at least one gas component in relation to a position of the second exhaust gas sensor in the exhaust gas tract as a relation to the second exhaust gas sensor signal,
means for estimating a conversion rate of the at least one exhaust gas component as a function of a relation between the second estimated value and the first estimated value of the determined emission, and
means for diagnosing the exhaust gas catalytic converter as a function of the determined conversion rate.

18. The system according to claim 17, wherein
the first estimated value and the second estimated value are in each case integrated over a predetermined period in time or over a predetermined length of route covered by a motor vehicle and
the conversion rate of the at least one exhaust gas component is estimated as a function of a relation between the integrated second and the integrated first estimated value of the emission.

19. The system according to claim 18, wherein
at least one value, which is representative of a driving profile with which the motor vehicle is currently being driven is each time integrated over the predetermined period of time or over the predetermined distance covered by a motor vehicle,
a correspondence of the driving profile with at least one part of a predetermined test cycle is determined as a function of the at least one integrated value,
the estimated conversion rate is compared with a predetermined conversion rate for the—at least one—part of the predetermined test cycle in each case once the correspondence has been determined, and
a first error is detected as a function of the estimated conversion rate and the predetermined conversion rate.

20. The system according to claim 17, wherein
a temperature of the exhaust gas catalytic converter is detected or determined and the relevant estimated conversion rate is allocated,
a chronological sequence of the detected or the determined temperatures of the exhaust gas catalytic converter is checked for the presence of a predetermined temperature curve and
if the predetermined temperature curve is present, a chronological sequence that belongs to a chronological sequence of the detected or the determined temperatures of the exhaust gas catalytic converter of the estimated conversion rates is in each case checked for the presence of a conversion rate curve that is characteristic of a second error.

\* \* \* \* \*